US012583136B2

(12) United States Patent
Petrelli

(10) Patent No.: US 12,583,136 B2
(45) Date of Patent: Mar. 24, 2026

(54) MOUNTING ASSEMBLY

(71) Applicant: KONINKLIJKE PHILIPS N.V., Eindhoven (NL)

(72) Inventor: Marcus Cornelis Petrelli, Groningen (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 271 days.

(21) Appl. No.: 18/578,794

(22) PCT Filed: Jul. 13, 2022

(86) PCT No.: PCT/EP2022/069619
§ 371 (c)(1),
(2) Date: Jan. 12, 2024

(87) PCT Pub. No.: WO2023/285540
PCT Pub. Date: Jan. 19, 2023

(65) Prior Publication Data

US 2024/0326271 A1 Oct. 3, 2024

(30) Foreign Application Priority Data

Jul. 15, 2021 (EP) .................................... 21185880

(51) Int. Cl.
*B26B 19/38* (2006.01)
*B26B 19/04* (2006.01)
*B26B 19/06* (2006.01)

(52) U.S. Cl.
CPC .......... *B26B 19/386* (2013.01); *B26B 19/048* (2013.01); *B26B 19/063* (2013.01)

(58) Field of Classification Search
CPC ... B26B 19/048; B26B 19/063; B26B 19/386; B26B 19/02; B26B 19/04;
(Continued)

(56) References Cited

U.S. PATENT DOCUMENTS 3,938,247 A * 2/1976 Carbonell ............. B26B 21/225 30/47
4,797,998 A 1/1989 Motta
(Continued)

FOREIGN PATENT DOCUMENTS

| | | | |
|---|---|---|---|
| EP | 2145740 | A1 | 1/2010 |
| JP | 2004242769 | A | 9/2004 |
| JP | 2016077464 | A | 5/2016 |

OTHER PUBLICATIONS

International Search report and Written Opinion of PCT/EP2022/069619, dated Oct. 20, 2022.

*Primary Examiner* — Boyer D Ashley
*Assistant Examiner* — Robert D Cornett

(57) ABSTRACT

According to an aspect, there is provided a mounting assembly 20 for a hair cutting appliance 10, the mounting assembly comprising: a head 24 configured to receive a cutting unit 14; a base 22 coupled to the head; a pivoting mechanism 30 coupling the base to the head, wherein the pivoting mechanism is configured to permit pivoting movement of the head relative to the base about a head pivot axis 50; and a rotatable locking element 40 configured to be rotated between: an engaged position, in which the locking element obstructs pivoting movement of the head to thereby lock the head in a locked position about the head pivot axis, and a disengaged position in which the locking element does not obstruct pivoting movement of the head such that the head is freely pivotable relative to the base about the head pivot axis; wherein the locking element is configured such that rotating the locking element to the engaged position drives the head into the locked position.

14 Claims, 4 Drawing Sheets

(58) Field of Classification Search
CPC .............. B26B 19/3806; B26B 19/382; B26B 19/3853; B26B 19/06
USPC ....... 30/32, 43.1, 50, 57, 58, 59, 61, 66, 67, 30/527, 529, 530
See application file for complete search history.

(56) References Cited

U.S. PATENT DOCUMENTS

| | | | |
|---|---|---|---|
| 4,930,217 | A | 6/1990 | Wolf |
| 9,457,485 | B2 | 10/2016 | Pohl et al. |
| 2010/0175259 | A1 * | 7/2010 | Shigeta ................. B26B 19/048 30/34.1 |
| 2010/0175260 | A1 | 7/2010 | Shigeta et al. |
| 2013/0111759 | A1 | 5/2013 | Pohl et al. |
| 2019/0061182 | A1 * | 2/2019 | Yan ..................... B26B 19/3866 |

* cited by examiner

MOUNTING ASSEMBLY

CROSS-REFERENCE TO PRIOR APPLICATIONS

This application is the U.S. National Phase application under 35 U.S.C. § 371 of International Application No. PCT/EP2022/069619, filed on Jul. 13, 2022, which claims the benefit of European Patent Application No. 21185880.8, filed on Jul. 15, 2021. These applications are hereby incorporated by reference herein.

FIELD OF THE INVENTION

The invention relates to a mounting assembly for a hair cutting appliance, and a hair cutting appliance.

BACKGROUND OF THE INVENTION

Hair cutting appliances such as beard trimmers and shavers typically have a contour following function which enables the blade to follow the contours of an object such as a face. However, these hair cutting appliances often also require a function which allows a particularly close shave, which appears to be best achieved when the blade it at an angle of approximately 20-30 degrees to the surface of the skin, particularly when hairs grow in random direction, which has been experimentally derived. Therefore, having the contour following for some applications can reduce the efficacy of the trimmer for close shaving.

US2010175260 discloses an electric shaver including a gripper portion to be held by the user's hand and a head portion configured to hold a shaving-blade unit and supported to be swingable in predetermined directions with respect to the gripper portion. The head portion is provided with an edge-trimmer-blade unit configured to be switched between a ready-for-use state and a stored state by an operation element and an engaging portion for fixing the head portion, the engaging portion configured to be engaged with the operation element when the edge-trimmer-blade unit is switched to the ready.

SUMMARY OF THE INVENTION

According to a first specific aspect, there is provided a mounting assembly for a hair cutting appliance, the mounting assembly comprising: a head configured to receive a cutting unit; a base coupled to the head; a pivoting mechanism coupling the base to the head, wherein the pivoting mechanism is configured to permit pivoting movement of the head relative to the base about a head pivot axis; and a rotatable locking element configured to be rotated between: (i) an engaged position, in which the locking element obstructs pivoting movement of the head to thereby lock the head in a locked position about the head pivot axis, and (ii) a disengaged position in which the locking element does not obstruct pivoting movement of the head such that the head is freely pivotable relative to the base about the head pivot axis; wherein the locking element is configured such that rotating the locking element to the engaged position drives the head into the locked position.

The locking element may be configured to rotate about a locking axis, the locking axis being perpendicular to the head pivot axis.

The mounting assembly may comprise a paddle fixed to the head and extending from the head towards the base. The locking element may be configured to interact with the paddle to lock the head in the locked position, when in the engaged position. The paddle may be configured to extend between arms of the pivoting mechanism disposed between the bar and the head, and to engage with each arm at a respective limit to obstruct pivoting movement of the head beyond the limit.

The locking element may comprise a locking tab, wherein the locking tab is configured to obstruct pivoting movement of the head when the locking element is in the engaged position. The locking element may comprise two locking tabs which are configured to obstruct pivoting movement of the head in opposing directions when the locking element is in the engaged position, to thereby lock the head in the locked position.

The locking tabs may be disposed on opposing sides of a locking element and may obstruct pivoting movement for example by engaging the head, a paddle fixed to the head, or the pivoting mechanism. The two locking tabs may each engage different parts of the mounting assembly to provide opposing moments to the head or the pivoting mechanism to thereby lock the head in the locked position. The tabs may be disposed 180 degrees apart on a base of the locking element. During rotation of the locking element, the tabs may therefore approach and engage with different parts of the mounting assembly to provide opposing moments.

The mounting assembly may comprise two paddles spaced apart in a direction parallel to the head pivot axis. Each locking element may be configured to interact with a respective paddle to provide opposing pivoting moments to the head about the head pivot axis.

The locking element comprises a third locking tab and optionally a fourth locking tab such that rotating the locking element in opposite directions can lock the head in two different locked positions.

The locking tabs may have a stiffness defined by an increase in moment on the pivoting mechanism for every degree of rotation when in the locked position. The stiffness may be more than approximately 7.5 Nmm/degree. The stiffness may be between approximately 0.5 Nmm/degree and 7.5 Nmm/degree.

The pivoting mechanism may comprise a four-bar linkage including a pair of arms extending between the head and the base and coupled to the head and the base at respective head joints and base joints, which each permit pivoting movement about respective parallel pivot axes, wherein the head is one bar, the base is one bar and each arm is one bar of the four-bar linkage. The locking element may be configured to interact with the pivoting mechanism in the engaged position to lock the head in the locked position.

The pivoting mechanism may comprise two four-bar linkages which are spaced apart in a direction parallel to the head pivot axis, wherein the head is one bar, and the base is one bar, of both four-bar linkages. There may be two arms extending between the head and the base for each four-bar linkage such that there are a total of four arms, or there may be two arms where each arm may comprise two diverging strands, with each diverging strand forming one bar of a different four-bar linkage.

Each paddle may be configured to extend from the head to the base between the arms at different four-bar linkages.

According to a second aspect, there is provided a hair cutting appliance comprising a mounting assembly according to any preceding claim.

These and other aspects will be apparent from and elucidated with reference to the embodiment(s) described hereinafter.

BRIEF DESCRIPTION OF THE DRAWINGS

Exemplary embodiments will now be described, by way of example only, with reference to the following drawings, in which.

DETAILED DESCRIPTION OF THE EMBODIMENTS

Figure 1:
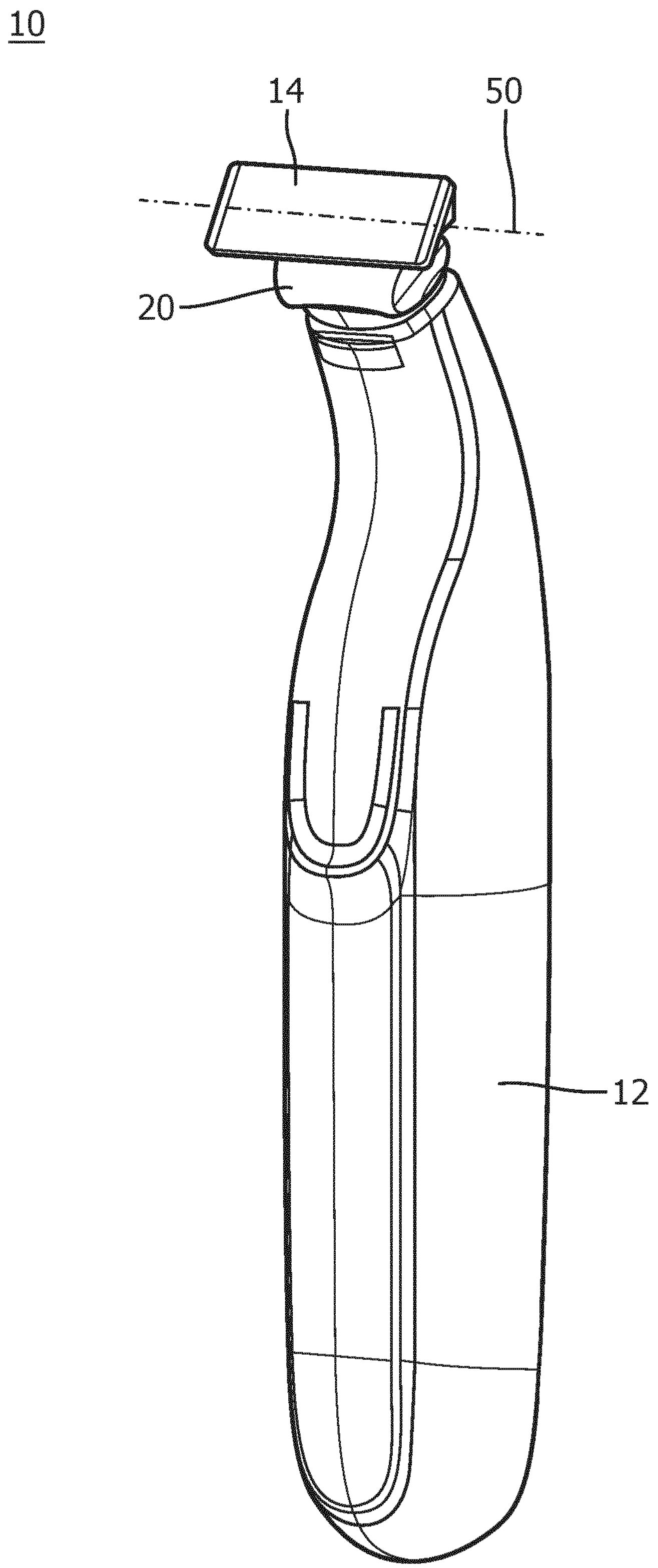
FIG. 1 schematically shows an isometric view of a hair cutting appliance.

FIG. 1 shows a hair cutting appliance 10 comprising a handle 12, a mounting assembly 20 fixed to the handle 12 and a cutting unit 14 received on the mounting assembly 20. The mounting assembly 20 is configured to enable pivoting movement about a head pivot axis 50 of the cutting unit 14 relative to the handle 12. In some examples, the mounting assembly may further enable pivoting movement about a secondary axis, perpendicular to the head pivot axis, such that the cutting unit is pivotable about two perpendicular axes with respect to the handle.

Figure 2:
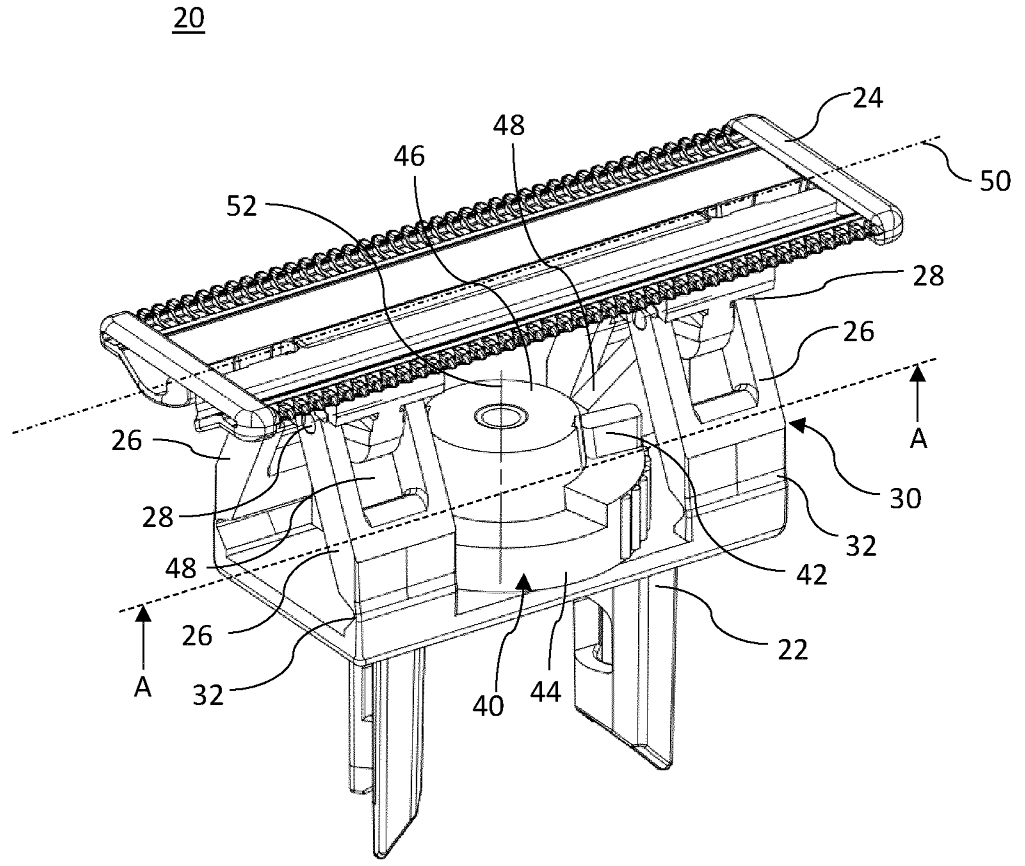
FIG. 2 schematically shows an isometric view of a mounting assembly for a hair cutting appliance.
Figure 3:
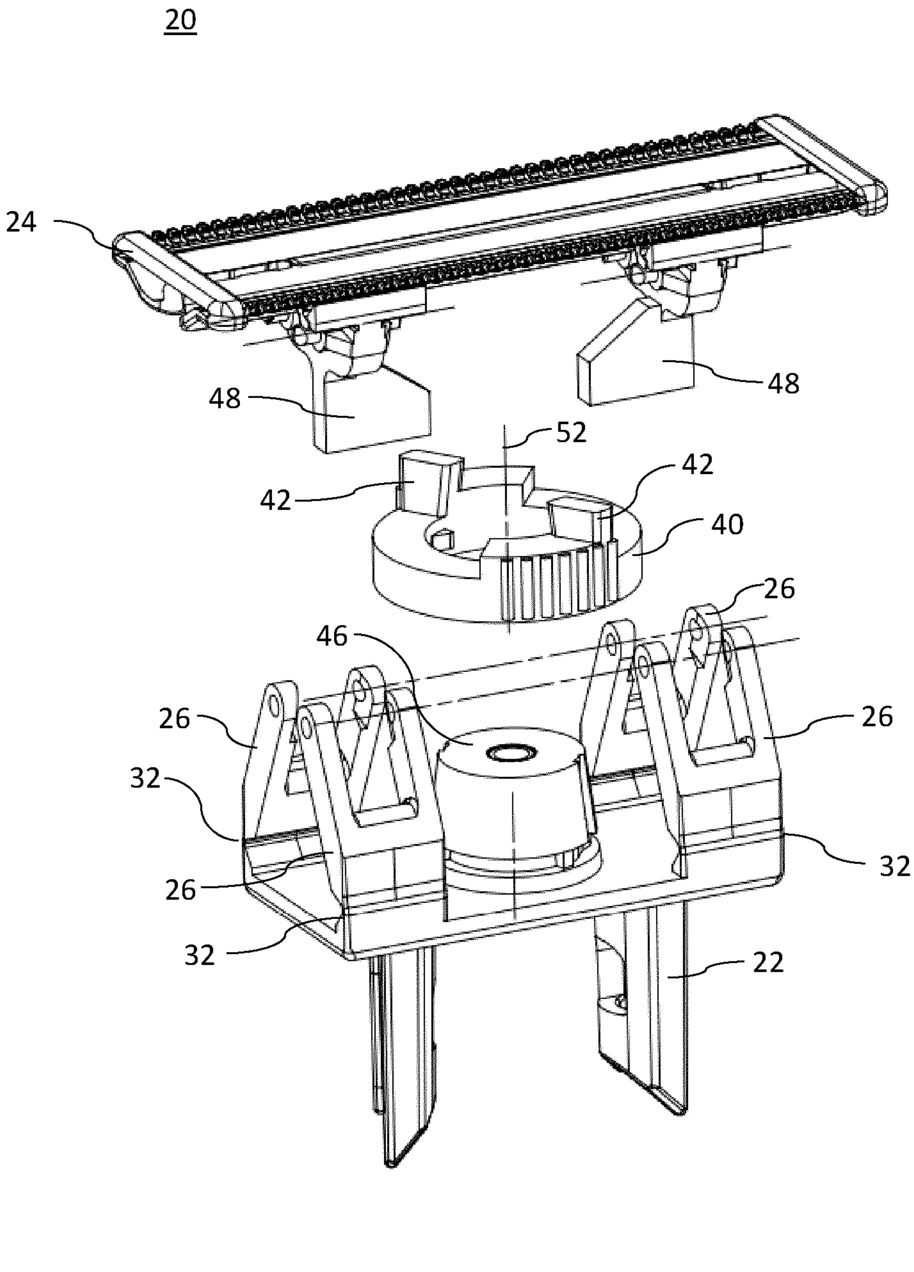
FIG. 3 schematically shows an exploded view of the mounting assembly of FIG. 2.
Figure 4:
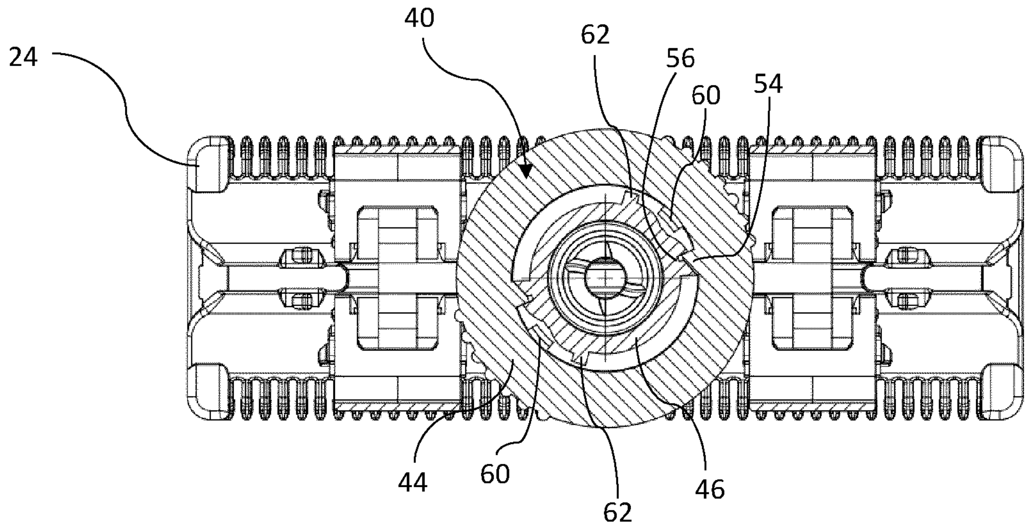
FIG. 4 schematically shows a cross-sectional view of the mounting assembly of FIGS. 2 and 3.

FIG. 2 shows the mounting assembly 20 in more detail, FIG. 3 shows an exploded view of the mounting assembly 20 and FIG. 4 shows a cross sectional view through line A-A of the mounting assembly 20. Each of these figures omits driving parts for driving a cutting unit which may be attached to the mounting assembly, however, it will be appreciated that the mounting assembly may further comprise such driving parts to reciprocally drive a cutting unit.

The mounting assembly 20 comprises a base 22 and a head 24 (only the head 24 is shown in FIG. 4). The base 22 is configured to be fixed to the handle 12. The head 24 is configured to receive the cutting unit 14. The base 22 is coupled to the head 24 such that the head 24 is pivotably moveable relative to the base 22. In some examples, the base may be integral with a handle.

The mounting assembly 20 comprises a pivoting mechanism 30 coupling the base 22 to the head 24 and configured to permit pivoting movement of the head 24 relative to the base 22 about the head pivot axis 50. In this example, the pivoting mechanism 30 comprises two four-bar linkages, the four-bar linkages spaced apart in a direction parallel to the head pivot axis 50, and each four-bar linkage including a pair of arms 26 extending between the head 24 and the base 22. Each arm 26 is coupled to the head 24 at respective a head joint 28, and coupled to the base at a respective base joint 32, such that the head 24 is one bar and the base 22 is one bar of both four-bar linkages, and each arm 26 is one-bar of a respective one of the four-bar linkages. Therefore, there are a total of four arms 26 in this example.

The head joints 28, four in total in this example, permit pivoting movement between the respective arm 26 and the head 24 which they couple together about respective pivot axes which are parallel to the head pivot axis 50. The base joints 32 permit pivoting movement between the respective arm 26 and the base 22 which they couple together about respective pivot axes which are also parallel to the head pivot axis 50. The pivot axes of the head joints 28 are therefore parallel to the pivot axes of the base joints 32 to enable both four-bar linkages to move in unison with one another. The two four-bar linkages have the same dimensions, the head joints 28 of one four-bar linkage share the same pivot axes as the head joints 28 of the other four-bar linkage, and the base joints 32 of one four-bar linkage share the same pivot axes as the base joints 32 for the other four-bar linkage.

The pivoting mechanism 30 comprising a four-bar linkage ensures that the head pivot axis 50, about which the head 24 is pivotably moveable, is a virtual pivot axis which is located just above the head 24 on an opposing side of the head to the base 22. Having the head pivot axis 50 as a virtual pivot axis just above the head 24 enables better conformance of the head to the object to the which the hair cutting appliance 10 having this mounting assembly 20 is applied.

In other examples, the pivoting mechanism may comprise only a single four-bar linkage or the two four-bar linkages may have arms which comprise two diverging strands, with each diverging strand of a single arm forming one bar of different four-bar linkages. In yet further examples, the pivoting mechanism may comprise any suitable mechanism which permits pivoting movement of the head relative to the base about a head pivot axis, such as the head being coupling to the base by a simple pivot.

In this example, the mounting assembly 20 comprises a pair of paddles 48 fixed to the head 24 and extending from the head 24 towards the base 22. The paddles 48 are spaced apart along a direction parallel to the head pivot axis 50, and each paddle 48 extends between the arms 26 at different four-bar linkages. Therefore, each paddle 48 acts as a stroke limiter for each four-bar linkage, obstructing pivoting movement of the four-bar linkage beyond a limit on both pivoting directions. In other examples, the paddles may not extend between the four-bar linkages, or there may be only a single paddle, or no paddles.

The mounting assembly 20 further comprises a rotatable locking element 40 which is configured to selectively lock the head 24 in a locked position by selectively preventing pivoting movement of the head 24 relative to the base 22. The locking element 40 is fixed to the base 22, and in this example is rotatable about a rotation axis 52 which is perpendicular to the head pivot axis 50. In other examples the rotation axis may be any suitable axis, such as parallel to the head pivot axis.

In this example, the locking element 40 comprises a pair of locking tabs 42 protruding from a support 44 having a hollow, shallow, cylindrical profile, and disposed on opposing sides of the support 44, about the rotation axis 52. The locking tabs protrude from the support 44 in a direction towards the head 24. In this example, the locking tabs 42 are disposed 180 degrees apart around the rotation axis 52 on the support 44 of the locking element 40. In other examples, the locking tabs may protrude in any suitable direction and may be disposed in any suitable locations around the support.

The locking element 40 is configured to sit around a central column 46 projecting from the base 22 towards the head 24, and to rotate relative to the central column 46. The locking element 40 is configured to rotate between an engaged position (shown in FIG. 2) and a disengaged position (not shown). The central column may include a central aperture for receiving parts of a driving unit for reciprocally driving a cutting unit on the mounting assembly. In other examples, a driving unit may be placed in any suitable location.

In this example, in the engaged position, the locking tabs 42 of the locking element 40 are configured to interact with the paddles 48 fixed to the head 24 to obstruct pivoting movement of the head 24 to lock the head 24 into the locked position. Being able to lock the head 24 in a locked position may be advantageous, if for example, a user would like to be able to use the hair trimmer at a predefined angle without movement of the trimmer, or for travel.

When the locking element 40 is rotated between the engaged and the disengaged position, the locking tabs 42 on opposing sides of the locking element each approach, and engage with, different paddles 48 such that each locking tab 42 is configured to provide opposing pivoting moments to the head 24 via the paddles 48 about the head pivot axis 50, thereby locking the head 24 in the locked position.

When the locking element 40 is rotated to the disengaged position, the locking tabs 42 do not obstruct pivoting movement of the head 24 relative to the base 22 about the head pivot axis 50, such that the head 24 is freely pivotable relative to the base 22 about the head pivot axis 50.

The locking element 40 is configured to engage with the head 24 or the pivoting mechanism during its rotation towards the engaged position, which drives the head 24 into the locked position such that the head does not have to be manually positioned in the locked position to be locked there.

The locking element 40 is held in the engaged position by interaction of the support 44 of the locking element 40 with the central column 46 (best seen in FIG. 4). The support 44 comprises a pair of snap tabs 54 projecting from an inner surface of the hollow cylindrical shape, which are configured to cooperate with a corresponding respective pair of snap channels 56 projecting from an outer surface of the central column 46 in a snap fit arrangement. In other examples, there may be a frictional fit which holds the locking element in the engaged position, or any other means of holding the locking element relative to the central column or other part of the base with which the locking element may interact.

The support 44 also comprises a block 60 projecting from the inner surface of the support 44. The block 60 is configured to cooperate with a stop 62 on an outer surface of the central column 46 to prevent rotation of the locking element 40 relative to the central column 46 beyond the disengaged position. The outer radius of the central column 46 also increases up to the stop 62 so that the block 60 frictionally cooperates with the central column 46 to hold the locking element 40 in the disengaged position when the block 60 abuts the stop 62.

The locking tabs 42 have a stiffness defined by an increase in moment on the head 24 for every degree of rotation of the head 24 about the head pivot axis 50 when the locking tabs 42 are in engagement with the paddles 48. The stiffness in this example is approximately 7.5 Nmm/degree to ensure that the locking tabs 42 remain securely lock the head 24 in the locked position. In other examples, the locking tabs may be more flexible such that they have a stiffness of approximately 0.5 Nmm/degree. This enables the head to move slightly in the locked position, effectively increasing the stiffness of the pivoting mechanism. Having more flexible locking tabs which allow some movement of the head can be beneficial to users with non-sensitive skin as they can apply higher loads to the mounting assembly to achieve an even closer shave.

Although it has been described that the locking element 40 comprises two locking tabs 42 which interact with respective paddles 48 to lock the head 24 in the locked position, in some examples, the locking element may comprise only a single locking tab, which may obstruct pivoting movement of the head by engaging with the paddle, the head or the pivoting mechanism, and pushing the head, paddle or pivoting mechanism up to a locked position being the limit where the paddle engages one of the arms of the four-bar linkage. In other examples, the locking element may comprise three or four locking tabs such that the locking element can be rotated in two different directions to two different engaged positions, to provide two different locked positions for the head.

In further examples, if there are no paddles, the locking tabs may be configured to engage with the arms of the four-bar linkage to obstruct pivoting movement of the head to thereby lock the head in the locked position when the locking element is in the engaged position.

In yet further examples, in which there are no locking tabs on the locking element, other parts of the locking element may be configured to obstruct pivoting movement of the head with respect to the base to lock the head in the locked position about the head pivot axis, for example, the locking element may be disposed between two arms of the same four-bar linkage with a rotationally irregular shape about the rotation axis, such as an oval cross sectional shape. When the long dimension of the oval is parallel to the head pivot axis, the locking element may be in a disengaged position so as not to interfere with the pivoting movement of the head, and when the long dimension is rotated towards being perpendicular to the head pivot axis, the locking element may be engaged with the arms of the pivoting mechanism to prevent pivoting movement of the arms relative to the base, and thus prevent pivoting movement of the head about the head pivot axis.

Although it has been described that the locking element has an engaged position and a disengaged position, the locking element may have further intermediate positions between the engaged position and the disengaged position to which the locking element can be rotated and held, for example by a frictional interaction between the central column and the support. In the intermediate positions, the locking tabs may permit the head to move freely about the head pivot axis, but may limit pivoting movement of the head to a new limit before the paddles engage with the arms. This may enable a user to select a more limited range of pivoting movement of the head.

Variations to the disclosed embodiments can be understood and effected by those skilled in the art in practicing the principles and techniques described herein, from a study of the drawings, the disclosure and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope.

The invention claimed is:

1. A mounting assembly for a hair cutting appliance, the mounting assembly comprising:

a head configured to receive a cutting unit;

a base coupled to the head;

a pivoting mechanism coupling the base to the head, wherein the pivoting mechanism is configured to permit pivoting movement of the head relative to the base about a head pivot axis; and a rotatable locking element configured to be rotated between:

(i) an engaged position, in which the locking element obstructs pivoting movement of the head to thereby lock the head in a locked position about the head pivot axis, and (ii) a disengaged position in which the locking element does not obstruct pivoting movement of the head such that the head is freely pivotable relative to the base about the head pivot axis;

wherein the locking element is configured such that rotating the locking element to the engaged position drives the head into the locked position.

2. A mounting assembly according to claim 1, wherein the locking element is configured to rotate about a locking axis, the locking axis being perpendicular to the head pivot axis.

3. A mounting assembly according to claim 1, comprising a paddle fixed to the head and extending from the head towards the base, wherein the locking element is configured to interact with the paddle to lock the head in the locked position, when in the engaged position.

4. A mounting assembly according to claim 3, wherein the paddle is configured to extend between arms of the pivoting mechanism disposed between the bar and the head, and to engage with each arm at a respective limit to obstruct pivoting movement of the head beyond the limit.

5. A mounting assembly according to claim 1, wherein the locking element comprises a locking tab, wherein the locking tab is configured to obstruct pivoting movement of the head when the locking element is in the engaged position.

6. A mounting assembly according to claim 5, wherein the locking element comprises two locking tabs which are configured to obstruct pivoting movement of the head in opposing directions when the locking element is in the engaged position, to thereby lock the head in the locked position.

7. A mounting assembly according to claim 3, comprising two paddles spaced apart in a direction parallel to the head pivot axis, wherein each locking element is configured to interact with a respective paddle to provide opposing pivoting moments to the head about the head pivot axis.

8. A mounting assembly according to claim 7, wherein the locking element comprises a third locking tab and optionally a fourth locking tab such that rotating the locking element in opposite directions can lock the head in two different locked positions.

9. A mounting assembly according to claim 5, wherein the locking tabs have a stiffness defined by an increase in moment on the pivoting mechanism for every degree of rotation when in the locked position, wherein the stiffness is more than approximately 7.5 Nmm/degree.

10. A mounting assembly according to claim 5, wherein the locking tabs have a stiffness defined by an increase in moment on the pivoting mechanism for every degree of rotation, wherein the stiffness is between approximately 0.5 Nmm/degree and 7.5 Nmm/degree.

11. A mounting assembly according to claim 1, wherein the pivoting mechanism comprises a four-bar linkage including a pair of arms extending between the head and the base and coupled to the head and the base at respective head joints and base joints, which each permit pivoting movement about respective parallel pivot axes, wherein the head is one bar, the base is one bar and each arm is one bar of the four-bar linkage, wherein the locking element is configured to interact with the pivoting mechanism in the engaged position to lock the head in the locked position.

12. A mounting assembly according to claim 11, wherein the pivoting mechanism comprises two four-bar linkages which are spaced apart in a direction parallel to the head pivot axis, wherein the head is one bar, and the base is one bar, of both four-bar linkages.

13. A mounting assembly according to claim 1, wherein each paddle is configured to extend from the head to the base between the arms at different four-bar linkages.

14. A hair cutting appliance comprising a mounting assembly according to claim 1.

* * * * *